United States Patent [19]

Gerstenberg et al.

[11] Patent Number: 5,330,852
[45] Date of Patent: Jul. 19, 1994

[54] MAGNETO-OPTICAL MEMORY AND METHOD OF PRODUCING SUCH A MEMORY

[75] Inventors: Klaus W. Gerstenberg, Halstenbek; Heinrich Heitmann, Winsen/Luhe, both of Fed. Rep. of Germany

[73] Assignee: U.S. Philips Corporation, New York, N.Y.

[21] Appl. No.: 524,719

[22] Filed: May 15, 1990

Related U.S. Application Data

[63] Continuation of Ser. No. 147,846, Jan. 25, 1988, abandoned.

[30] Foreign Application Priority Data

Jan. 28, 1987 [DE] Fed. Rep. of Germany ....... 3702480

[51] Int. Cl.⁵ .............................................. G11B 5/66
[52] U.S. Cl. ............................. 428/694 DE; 428/446; 428/900; 365/122
[58] Field of Search ................ 420/694, 900; 428/336, 428/446, 447; 365/122

[56] References Cited

U.S. PATENT DOCUMENTS

| | | | |
|---|---|---|---|
| 4,579,777 | 4/1986 | Honguu | 428/336 |
| 4,582,746 | 4/1986 | Shirahata et al. | 428/900 |
| 4,596,740 | 6/1986 | Tsukana | 428/336 |
| 4,610,912 | 9/1986 | Takahashi | 428/213 |
| 4,628,485 | 12/1986 | Tanaka | 365/122 |
| 4,637,953 | 1/1987 | Sawamura | 428/694 |
| 4,649,451 | 3/1987 | Tomita | 428/900 |
| 4,719,137 | 1/1988 | Ohta et al. | 428/67 |

FOREIGN PATENT DOCUMENTS 016013 1/1924 Japan.

*Primary Examiner*—Paul J. Thibodeau
*Assistant Examiner*—R. Follett
*Attorney, Agent, or Firm*—Norman N. Spain

[57] ABSTRACT

Magneto-optical memory having a substrate of a material which is transparent for the visible-to-infrared spectral range, on which there are provided, in this sequence, a dielectric layer which is transparent for the visible-to-infrared spectral range and has a refractive index which is higher than the refractive index of the substrate and constitutes a diffusion barrier layer for oxygen and/or water, an in essence amorphous and/or in essence micro-crystalline magneto-optical layer with uniaxial anisotropy and a magnetic ordering temperature higher than ambient temperature and a top layer which acts as a reflection or interference layer and as a diffusion barrier layer for oxygen and/or water, the dielectric layer being a layer which is deposited from organic silicon materials by means of a PCVD process.

9 Claims, 1 Drawing Sheet

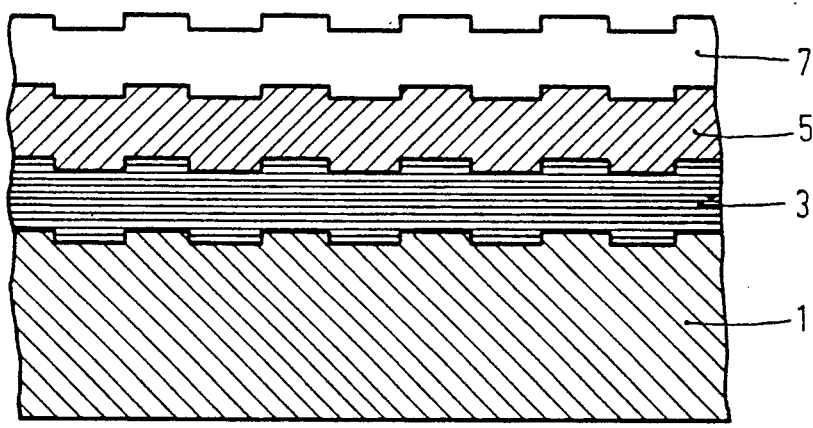

MAGNETO-OPTICAL MEMORY AND METHOD OF PRODUCING SUCH A MEMORY

This is a continuation of application Ser. No. 147,846, filed Jan. 25, 1988, now abandoned.

BACKGROUND OF THE INVENTION

The invention relates to a magneto-optical memory having a substrate of a material which is transparent for the visible to infrared spectral range and on which, there are provided, in the following sequence, a dielectric layer which is transparent for the visible-to-infrared spectral range and has a refractive index which is higher than the refractive index of the substrate and constitutes a diffusion barrier layer for oxygen and/or water, an essentially amorphous and/or essentially micro-crystalline magneto-optical layer with uni-axial anisotropy and a magnetic ordering temperature > ambient temperature and a top layer acting as a reflection or interference layer and as a diffusion barrier layer for oxygen and/or water. The invention also relates to a method of producing such a memory.

In erasable magneto-optical memories writing, reading and erasing information can be effected by means of a localized electro-magnetic radiation.

Reading information from the memory is effected by utilizing either the magneto-optical Kerr effect in reflection or the Faraday effect in transmission.

An erasable magneto-optical memory of an essentially amorphous and/or essentially micro-crystalline magneto-optical storage material is disclosed in, for example, DE-PS 23 40 475.

The object of the dielectric layer is to increase the Kerr effect of the magneto-optical memory and to optimize the write, read and erase behaviour of the magneto-optical memory.

For an optimization of the read efficiency it is effective to provide above the magneto-optical layer a layer which acts either as a reflection or an interference layer, the top layer.

In addition, all the layers contiguous to the magneto-optical layer have the further function of protecting the magneto-optical layer from environmental influences, for example oxidation or corrosion, which might affect the length of operational life of a memory.

If a substrate made of a plastics material, for example polycarbonate, is used, the properties of the dielectric layer must satisfy specific requirements. Depositing the dielectric layer may only be effected at a comparatively low temperature (<80° C.), as otherwise the substrate might be negatively affected. There is however a disadvantage, namely that layers provided on the plastics substrate adhere poorly. The dielectric layer must be mechanically loadable, that is to say it must be elastic, so that it can compensate for internal stresses in the magneto-optical layer provided thereon and when the elastic substrate is distorted it does not crack or chip. The dielectric layer which constitutes a passivation layer for the magneto-optical layer must be chemically stable and must not react with the material of the magneto-optical layer. The optical properties of the dielectric layer must be such that at a wavelength of 800 nm, the operating range of a laser cooperating with the magneto-optical memory, it has a refractive index in the range from 1.9 to 2.5, it being necessary for the absorption at this wavelength to be low (absorption coefficient $k < 0.05$).

The combination of all the required properties is not met by the materials mentioned in the foregoing such as, for example, AlN, $SiO_2$, $CeO_2$, $Al_2O_3$, used for the dielectric layers. When oxygen-containing materials are used for the dielectric layer there is a risk that the properties of the magneto-optical layer in contact with it will change, for example due to diffusion processes, and is negatively affected. In addition, $SiO_2$ has a refractive index which is too low for such a use. Dielectric layers made of all the above-mentioned materials have furthermore too low a ductile yield, so that on mechanical loading of a comparatively elastic substrate they crack or chip and consequently can no longer perform their function as passivating layers.

SUMMARY OF THE INVENTION

The invention has for its object to provide a magneto-optical memory with more specifically an elastic substrate and with a dielectric layer as the optical matching layer, which has the required optical and improved mechanical properties and does not evidence any interactions with the magneto-optical layer in contact therewith.

According to the invention, this object is accomplished where the dielectric layer is a layer deposited onto the substrate from organic silicons by means of a PCVD (plasma activated chemical vapour deposition) process.

BRIEF DESCRIPTION OF THE DRAWING

The sole FIGURE in the drawing is a cross sectional view of a magneto-optical memory of the invention.

DETAILED DESCRIPTION OF THE INVENTION

In accordance with an advantageous further development of the invention, the dielectric layer is a layer which is deposited from hexamethyl disilazane $C_6H_{19}NSi_2$. During experiments which resulted in the present invention, it was found that layers deposited from hexamethyl disilazane are not only an excellent diffusion barrier layer for oxygen and/or water, which affect the properties of the magneto-optical layer, but that also their ductile yield behaviour is so good that internal stresses in the magneto-optical layer can be compensated.

In addition, the refractive index of the dielectric layers in accordance with the invention for the use of magneto-optical memories is located in the important 800 nm wave band is in the range from 1.9 to 2.5 with an absorption coefficient $k < 0.05$, so that these layers appropriately perform their function as optical matching layers.

In accordance with a further advantageous embodiment of the invention an additional dielectric layer which is transparent to the visible to infrared spectral range, and which layer is preferably deposited from a hexamethyl disilazane is provided between the magneto-optical layer and the top layer.

It is alternatively possible to implement magneto-optical memories according to the invention also in a what is commonly referred as quadrilayer arrangement.

The hexamethyl disilazane used to form the dielectric layer(s) has the particular advantage that magneto-optical layers of different compositions can be used to construct magneto-optical memories. For the magneto-optical layer adjacent to the dielectric layer(s) the material can be chosen from a ternary or quaternary system of at least one rare earth metal and at least one transition metal and optionally at least one further metallic component, for example a ternary or quaternary system of gadolinium and/or terbium and iron and/or cobalt. Preferably, gadolinium/terbium/iron or terbium/iron/cobalt is used for the magneto-optical layer.

A method of producing a magneto-optical memory having a substrate made of a material which is transparent for the visible to infrared spectral range, on which there are provided, in this sequence, a dielectric layer transparent for the visible to infrared spectral range having a refractive index which is higher than the refractive index of the substrate and constitutes a diffusion barrier layer for oxygen and/or water, an essentially amorphous and/or essentially micro-crystalline magneto-optical layer with uniaxial anisotropy and a magnetic ordening temperature higher than the ambient temperature and a top layer which acts as a reflection or interference layer and as a diffusion barrier layer for oxygen and/or water, is characterized, in that the dielectric layer is a layer which is deposited onto the substrate from organic silicon materials by means of a PCVD (plasma activated chemical vapor deposition) process, hexamethyl disilazane $C_6H_{19}NSi_2$ being preferably used as the process gas for the deposition of the dielectric layer.

In an advantageous further development of the method according to the invention nitrogen is first fed into the receptacle at a pressure in the range from 0.5 to 150 Pa, before the process gas, hexamethyl disilzane is supplied, and the plasma is ignited at a d.c. voltage potential on the HF electrode in the range from 100 to 1000 V, whereafter, after 200–300 s, hexamethyl disilazane is continuously supplied as a process gas until a pressure in the range from 0.5 to 150 Pa is obtained, the vapor deposition process being continued until the desired layer thickness has been reached. This does not only produce, as a result of back sputter effects at the substrate to be coated, cleaning of the substrate but also activation of the substrate surface to be coated, which results in an optimum adhesion of the layer to the substrate after deposition from hexamethyl disilazane.

In accordance with a further advantageous embodiment of the method according to the invention, the coating procedure is effected using a gas mixture of hexamethyl disilazane with a nitrogen content of 0.50 Vol.%. When the process gas contains a certain proportion of nitrogen, a particularly good plasma stability is obtained.

The advantages which can be obtained with the invention consist more specifically in that the long term stability of magneto-optical memories, which is determined by lower and upper limits of the magnetic properties of the magneto-optical material, such as, for example, the anisotropy $K_u$, the coercive field strength $H_c$ or the compensation temperature $T_{comp}$, and is affected by more specifically diffusion processes of oxygen and/or water in the boundary regions of the magneto-optical layer, is improved by layers deposited from organic silicon materials at the boundaries of the magneto-optical layer, dielectric layers of this type do not interact with the material off the magneto-optical layer and have an adequately high ductile yield, so that they can be used also on plastics substrates which are comparatively elastic. This furnishes the very important advantage for the practical use of erasable magneto-optical memories that they operate with reproducible accuracy also over long periods of use.

An embodiment of the invention for the production of dielectric layers, using hexamethyl disilazane will now be described by way of example in greater detail with reference to the sole figure of the drawing accompanying drawing.

Referring to FIG. 4, the polycarbonate substrate 1 which has a thickness of, for example, 1 mm and has a structure of guide grooves, is provided, in the following sequence, with a dielectric layer 3 which has a thickness of 80 nm and is deposited from hexamethyl disilazane, a magneto-optical layer 5 having a thickness of 45 nm and made of, for example, predominantly amorphous GdTbFe and a top layer 7 of, for example, Al, which acts as a reflection layer and has a thickness of 30 nm.

The vapor deposition of the layers is effected according to the following procedure:

First the dielectric layer 3 of hexamethyl disilazane $C_6H_{19}NSi_2$ is deposited on the substrate 1 with a thickness of 80 nm. For that purpose a single-electrode PCVD-arrangement is evacuated until a residual gas pressure of some $10^{-2}$ Pa, preferably $2 \times 10^{-2}$ Pa, is obtained. The substrate 1 to be coated is placed on the electrode and is not heated to a temperature higher than 80° C. during the process. To accomplish an appropriate adhesion of the dielectric layer 3 to the substrate 1, nitrogen is fed into the receptacle in a quantity of 6 sccm/min up to a pressure of $p \approx 1$ Pa. Subsequently, the plasma is ignited using a 13.56 MHz generator. The d.c. voltage potential generated on the HF electrode has a value of 200 V. After a duration of $\approx 200$ s the process gas hexamethyl disilazane is fed into the receptacle in a quantity of 10 sccm/min to a pressure of $p=2$ Pa and the supply of nitrogen ms reduced; the step of coating of the substrate is consequently carried out immediately subsequent to the step of preparing the substrate surface by means of nitrogen. The d.c. voltage potential on the HF electrode is adjusted to 500 V while providing the hexamethyl disilazane coating on the substrate. After a duration of $\approx 110$ s, a hexamethyl disilazane layer having a thickness of 80 nm has been deposited on the substrate 1.

Using the present method, dielectric layers having the following properties are produced:

| | |
|---|---|
| Refractive index at 800 nm | 1.99 |
| Absorption coefficient k at 800 nm | 0.03 |
| Ductile yield | >1% |
| Internal stress (pressure) | 500 MPa |
| Density | 1.7 g/cm$^3$. |

The substrate 1 coated with the dielectric layer 3 is removed from the arrangement after the HF power supply has been switched off, after turning off the gas supply and flushing the recipient with air and, subsequently thereto, the magneto-optical layer 5 is deposited. To achieve this, the following known method is, for example, carried out in this method by magnetron-cathode sputtering a 45 nm thick GdTbFe-layers is deposited using a target which corresponds to the desired layer composition. For this, purpose an argon pressure of 2·1 Pa is created in the receptacle and the layer is deposited at an anode voltage of 250 V in a magnetic field of $32.10^3$ A/m at a power density of 1.6 J/s/cm$^2$.

Subsequent thereto, a top layer 7 made of Al, having a thickness of 30 nm and acting as a reflection layer, is deposited on the magneto-optical layer 5. For that purpose an argon pressure of p=0.7 Pa is created in the receptacle. The layer is deposited in a magnetic field of $50.10^3$ A/m and a power density of 1.5 J/s/cm$^2$ at a 390 V anode voltage.

A magnetron sputtering arrangement to be used for the production of such a layer structure must advantageously have a plurality of sputter cathodes which are provided with corresponding targets, so as to provide that the substrate provided with the dielectric layer to be coated, can be coated in one single continuous process with further layers of different chemical compositions without it being necessary to open the device, to ensure that the in-flow of, for example, oxygen is reduced to a minimum.

What is claimed is:

1. A magneto-optical memory having a substrate of a material which is transparent for the visible to infrared spectral range and on which, there are provided in the following sequence, an elastic dielectric layer which is transparent at the visible-to-infrared spectral range and has a refractive index which is higher than the refractive index of the substrate and which at a wavelength of 800 nm is 1.9–2.5, has an absorption coefficient K<0.05 and constitutes a diffusion barrier layer for oxygen and/or water, and is deposited on the substrate from organic silicons by a PCVD (plasma-activated chemical vapor deposition) process, an essentially amorphous and/or micro-crystalline magneto-optical layer with uniaxial anisotropy and a magnetic ordering temperature>ambient temperature and a top layer acting as a reflection or interference layer and as a diffusion barrier layer for oxygen and/or water.

2. A magneto-optical memory as claimed in claim 1, characterized in that the dielectric layer is a layer which is deposited from hexamethyl disilazane $C_6H_{19}NSi_2$.

3. A magneto-optical memory as claimed in claim 1, characterized in that a further dielectric layer which is transparent for the visible-to-infrared spectral range and is preferably deposited from hexamethyl disilazane is provided between the magneto-optical layer and the top layer.

4. A magneto-optical memory as claimed in claim 1, characterized in that the substrate is made of plastics, more specifically of a polycarbonate.

5. A magneto-optical memory as claimed in claim 1, characterized in that the substrate is made of glass.

6. A magneto-optical memory as claimed in claim 1, characterized in that the magneto-optical layer consists of a material from a ternary or quaternary system of at least one rare earth metal and at least one transition metal and optionally at least a further metallic component.

7. A magneto-optical memory as claimed in claim 6, characterized in that the magneto-optical layer is made of a material from a ternary or quaternary system of gadolinium and/or terbium and iron and/or cobalt.

8. A magneto-optical memory as claimed in claim 7, characterized in that the magneto-optical layer consists of gadolinium/terbium/iron or terbium/iron/cobalt.

9. A magneto-optical memory as claimed in claim 1, characterized in that the top layer is made of metal or of an oxide, nitride or oxynitride of a metal or a semiconductor.

* * * * *

UNITED STATES PATENT AND TRADEMARK OFFICE
CERTIFICATE OF CORRECTION

PATENT NO.   : 5,330,852
DATED        : July 19, 1994
INVENTOR(S)  : Klaus W. Gerstenberg, et al It is certified that error appears in the above-indentified patent and that said Letters Patent is hereby corrected as shown below:

Col. 4,   line 6,    "Fig. 4" should be --the figure in the drawing--;
          line 33,   "ms" should be --is--;
          line 58,   "out in" should be --out. In--.

Signed and Sealed this

Twenty-ninth Day of November, 1994

Attest:

BRUCE LEHMAN

Attesting Officer    Commissioner of Patents and Trademarks